United States Patent [19]
Barbot et al.

[11] 4,100,989
[45] Jul. 18, 1978

[54] PNEUMATIC CELL FOR GAS CONFINEMENT IN SURFACE EFFECT VEHICLE

[75] Inventors: Jean Luc Y. Barbot, Les Lilas; Philippe M. Remon-Beauvais, Ris-Orangis, both of France

[73] Assignee: Etat Francais, Paris, France

[21] Appl. No.: 698,813

[22] Filed: Jun. 23, 1976

[30] Foreign Application Priority Data

Jun. 27, 1975 [FR] France .................................. 75 20205

[51] Int. Cl.² .............................................. B60V 1/16
[52] U.S. Cl. ..................................... 180/127; 180/126
[58] Field of Search ............... 180/116, 123, 124, 127, 180/128

[56] References Cited

U.S. PATENT DOCUMENTS

| 3,285,356 | 11/1966 | Cockerell | 180/127 |
| 3,339,655 | 9/1967 | Guienne | 180/127 |
| 3,756,343 | 9/1973 | Joyce | 180/127 |
| 3,921,753 | 11/1975 | Pont | 180/127 |

FOREIGN PATENT DOCUMENTS

1,423,649  2/1976  United Kingdom ................. 180/127

Primary Examiner—Joseph F. Peters, Jr.
Assistant Examiner—Terrance L. Siemens
Attorney, Agent, or Firm—Haseltine, Lake & Waters

[57] ABSTRACT

A flexible gas cushion confinement cell for a ground effect vehicle comprising two flexible walls extending substantially parallel to one another with flexible partitions extending transversely of the walls and joining them together over at least a part of their height. The walls define, in conjunction with one another and with the partitions, juxtaposed compartments which are open at their upper ends to enable them to be connected to a gas pressure source and which are closed or substantially closed at their lower ends. The cell is approximately of horseshoe-shape and can be provided with an additional wall and transverse deflectors extending between the legs of the horseshoe-shaped cell.

21 Claims, 11 Drawing Figures

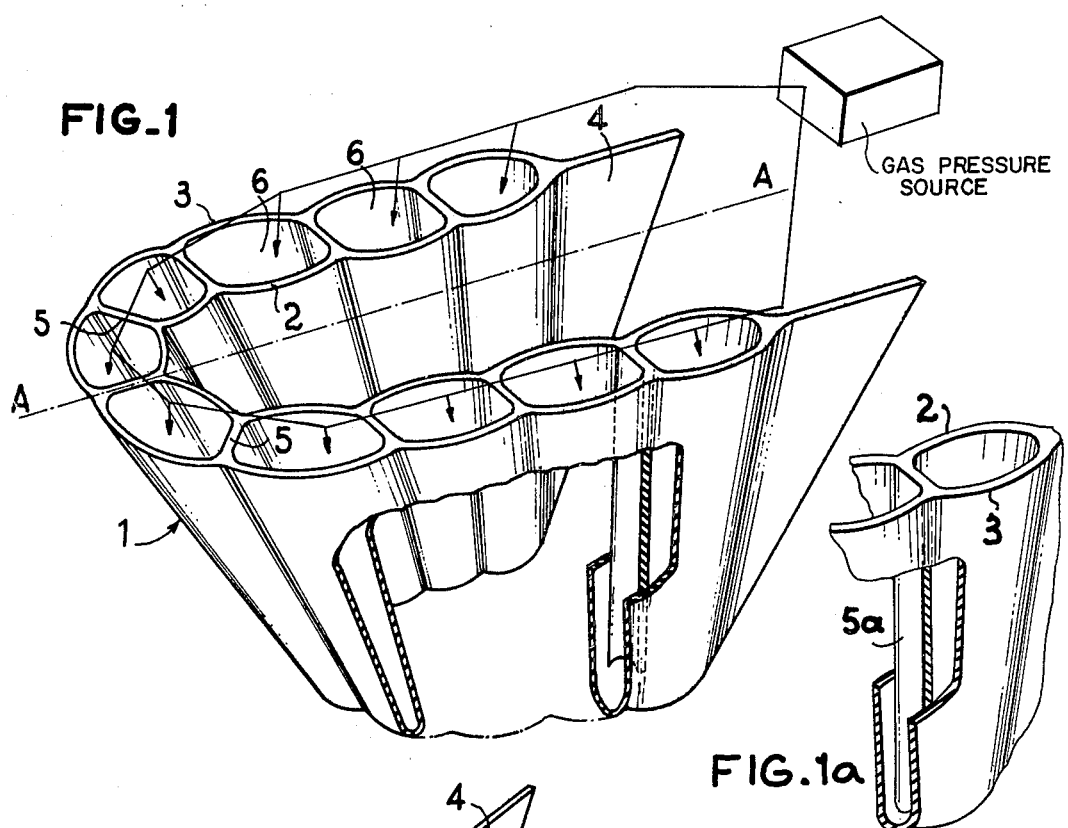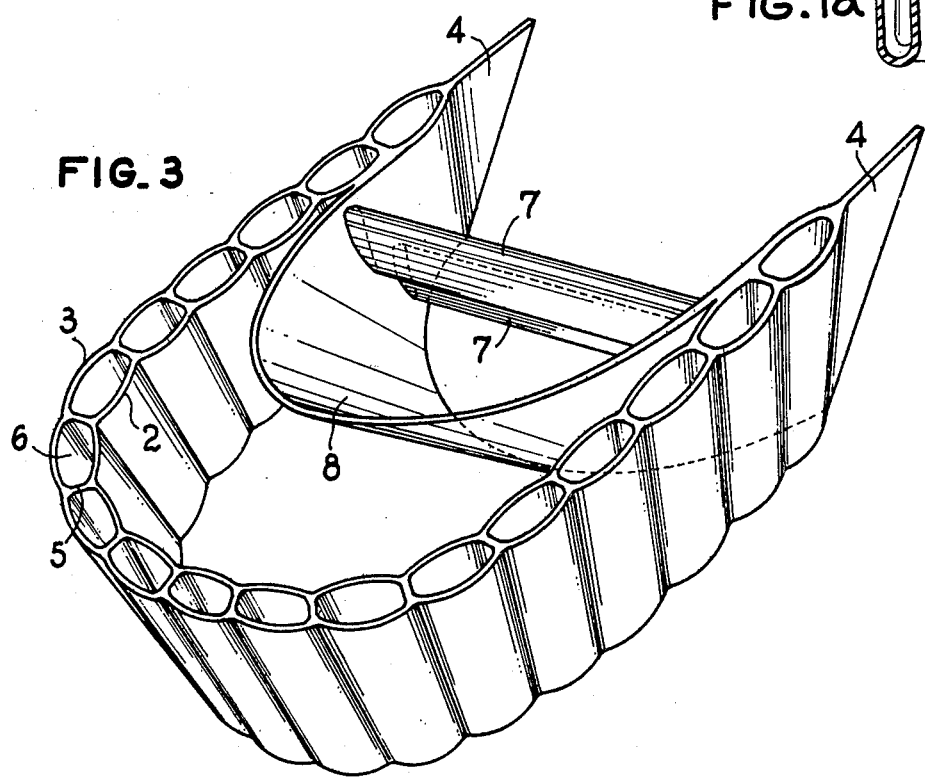

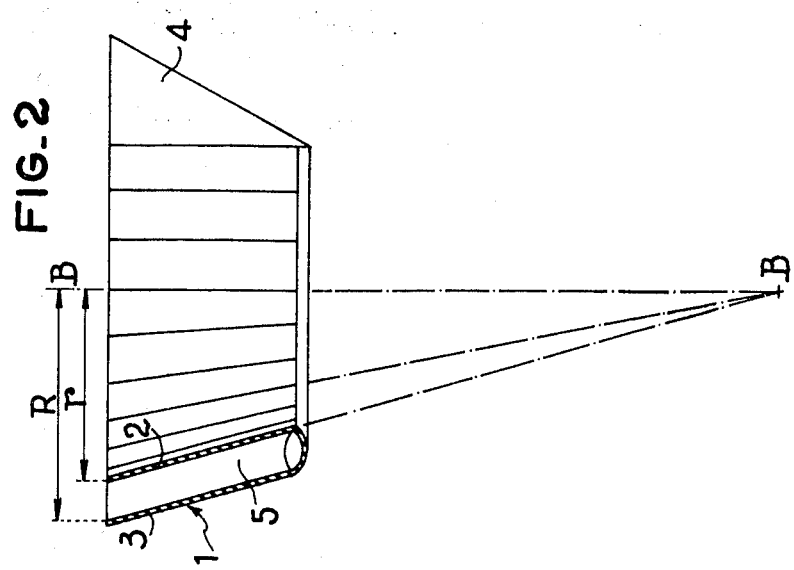
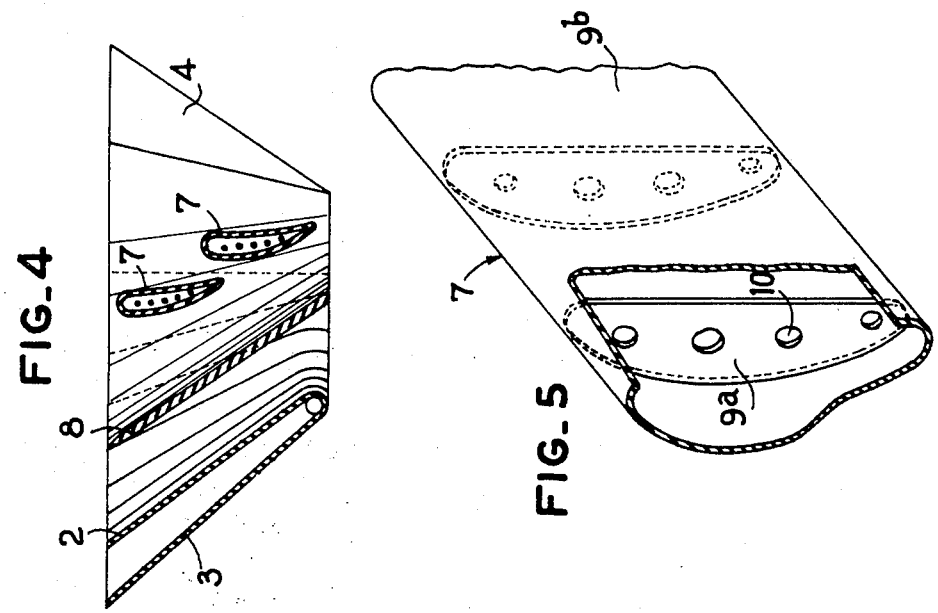

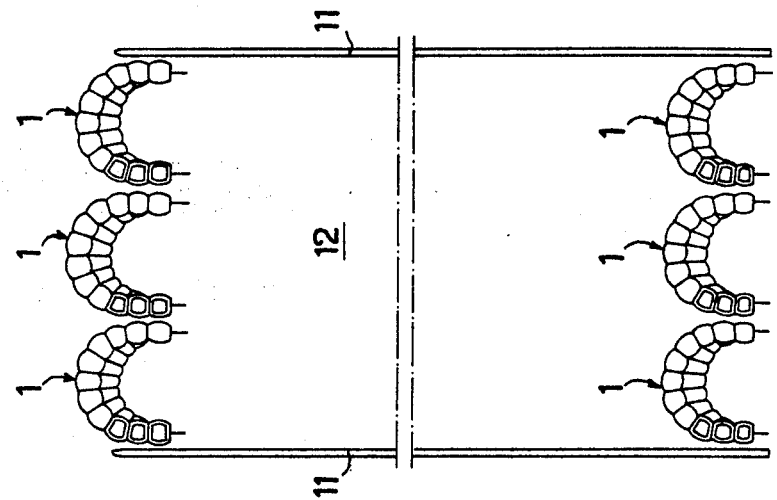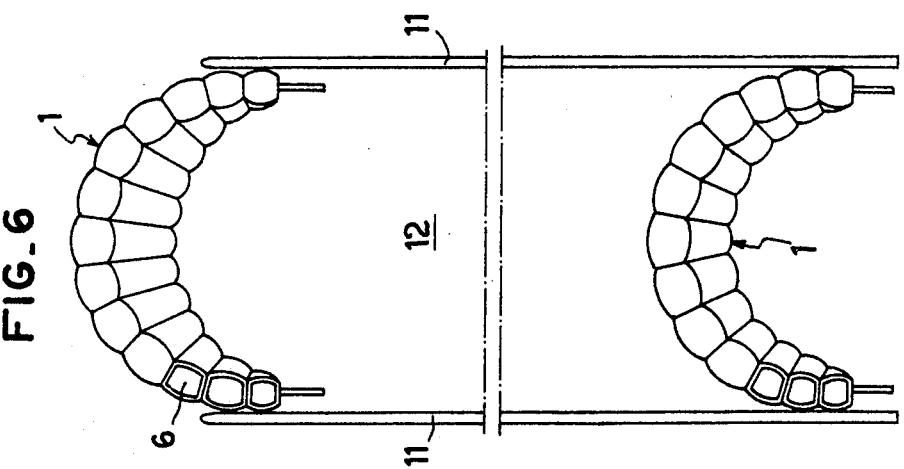

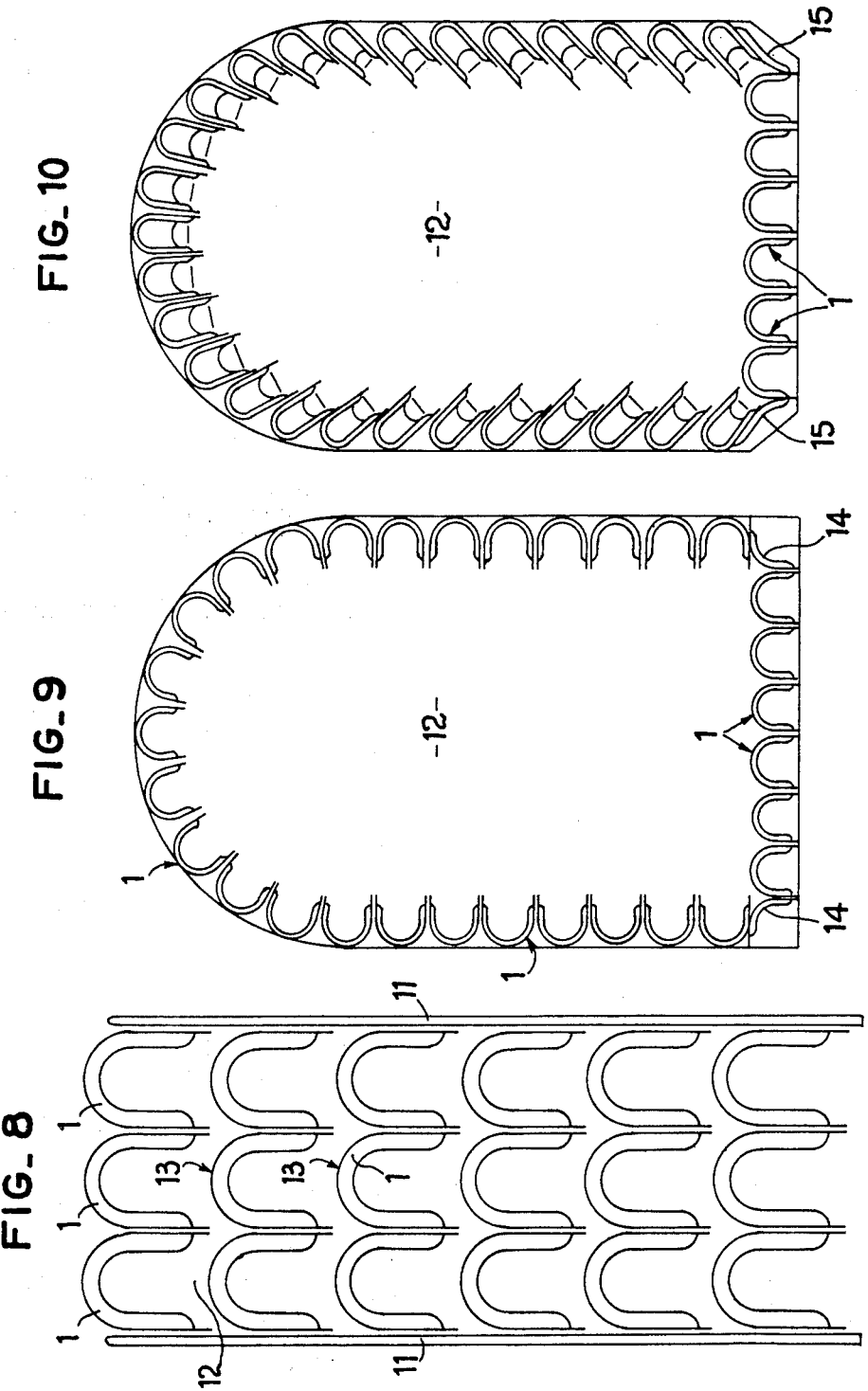

PNEUMATIC CELL FOR GAS CONFINEMENT IN SURFACE EFFECT VEHICLE

FIELD OF THE INVENTION

This invention relates to ground-effect vehicles and more especially to the flexible-cell barriers for confining the cushion of gas by which vehicles of this kind are supported.

BACKGROUND OF THE INVENTION

In one known type of ground-effect vehicle, the confinement barrier is formed by the juxtaposition of cells each comprising two flexible walls in the form of conical sectors having their concavity directed towards the interior of the vehicle and forming between them a bell-shaped space which is open at its lower end and which is fed primarily by the gas escaping from the cushion of gas created below the central part of the vehicle.

However, in the case of amphibious hovercraft and marine hovercraft with rigid lateral keels, also known as captive air bubble vessels or surface-effect craft, the use of this type of confinement barrier gives rise to serious problems so far as the rear closure of the gas cushion is concerned. This is because, when the liquid surface over which the vehicle travels is made rough by waves, the cells which close the gas cushion supporting the vehicle at its rear end have a tendency, on account of the fact that their concavity is directed in the direction of travel of the vehicle, i.e. towards the gas cushion, to deliver water towards the interior of their concavity, thus creating a "scooping" phenomenon which, on the one hand, gives rise to increases is resistance to the advance of the vehicle and, on the other hand, leads to considerable stresses in the constituent material of the cell walls which can cause tearing of that material.

In order to avoid this scooping phenomenon, it is also known to use a type of inflatable bag arranged at the rear of the vehicle between its two sides for the rear closure of the gas cushion. Unfortunately, this type of rear closure barrier for the gas cushion does not enable the opposing requirements of as high an impermeability to air as possible and as high a permeability to waves as possible to be satisfactorily reconciled.

SUMMARY OF THE INVENTION

An object of the present invention is to provide a gas cushion confinement cell for a ground-effect vehicle which combines adequate flexibility, to enable it to clear obstacles appearing in the path of the vehicle, with a high degree of elasticity to enable it to return quickly to its normal position after having been deflected by an obstacle. More specifically, the object of the invention is to provide a cell which may be used for the rear closure of surface-effect craft, reducing the phenomenon of scooping to a minimum.

Accordingly, the present invention contemplates a flexible gas cushion confinement cell for a ground-effect vehicle, distinguished by the fact that it comprises two flexible walls extending substantially parallel to one another and flexible partitions extending transversely of those walls and joining them together over at least part of their height, said walls defining in conjunction with one another and with said partitions juxtaposed compartments which are open at their upper ends to enable them to be connected to means for supplying gas under pressure and which are at least substantially closed at their lower ends.

According to one aspect of the invention, said walls are each in the form of a regulated surface.

According to another aspect of the invention, said walls are at least partly in the form of part of a truncated conoid, the compartments being open on the side of the major basis of the frustoconoidal sector formed, in part at least, by the walls.

BRIEF DESCRIPTION OF THE DRAWING

Other features and advantages of the invention will become apparent from the following description in conjunction with the accompanying drawings given by way of example, wherein:

FIG. 1 is a part cut-away perspective view of a flexible cell according to the invention.

FIG. 1a shows a portion of a modification of the cell of FIG. 1.

FIG. 2 is a view in section taken along the plane of symmetry of the cell shown in FIG. 1.

FIG. 3 is a perspective view of an improved cell according to the invention.

FIG. 4 is a view in section along the plane of symmetry of the cell shown in FIG. 3.

FIG. 5 is a part cut-away perspective view of a deflector with which the cell illustrated in FIGS. 3 and 4 is equipped.

FIG. 6 is a plan view of a first embodiment of a confinement barrier according to the invention for a surface-effect craft.

FIG. 7 is a plan view of a second embodiment of a confinement barrier according to the invention for a surface-effect craft.

FIG. 8 is a plan view of a third embodiment of a confinement barrier according to the invention for surface-effect craft.

FIG. 9 is a plan view of a first embodiment of a confinement barrier according to the invention for amphibious hovercraft.

FIG. 10 is a plan view of a second embodiment of a confinement barrier according to the invention for amphibious hovercraft.

DETAILED DESCRIPTION

FIGS. 1 and 2 show a cell 1 according to the invention, a so-called base cell, which comprises an inner wall 2 and an outer wall 3 which extend substantially parallel to one another and each of which is in the form of a regulated surface. According to the invention, this regulated surface is preferably that of part of a truncated conoid extended tangentially, from its limiting generatrices, by two flat parts extending parallel to one another, as illustrated. The assembly formed by the walls 2 and 3 has a plane of symmetry which is parallel to the two above mentioned flat parts and which comprises the axis B—B of the truncated conoid portions so that, in a plane perpendicular to this plane of symmetry, the walls 2 and 3 have a curved profile in the form of a horseshoe. The upper and lower edges of the walls 2 and 3 are defined by two planes extending parallel to one another and perpendicularly to the plane of symmetry, the lower edges of these walls being joined together over their entire length, while the terminal edges of these small walls are also joined together over their entire height substantially parallel to the axis B—B. The walls 2 and 3 thus form a pocket of which the curved part represents a frustoconoidal sector and which comprises two parallel arms tangentially extending the frustoconoidal sector. From the ends of these arms, and in their extension, there extend two flexible triangular supporting sails 4 for fixing to the structure of a ground effect vehicle, each having one of their sides situated in the plane defining the upper edges of the walls 2 and 3.

Depending on the application envisaged, a generatrix of the frustoconoidal sector comprised within the plane of symmetry may form with the axis B—B of this frustoconoidal sector an angle of, preferably, from 5° to 45°.

The walls 2 and 3 are also joined together at intervals by flexible partitions 5 arranged transversely of the walls and extending over their entire height as shown in FIG. 1a at 5a or only over a part thereof as shown in FIG. 1 at 5. The walls 2 and 3 may be joined together and to the partitions 5 by bonding or by any other suitable assembly technique.

In the embodiment illustrated by way of example in FIGS. 1 and 2, the flexible partitions 5 extend from the upper edges of the walls 2 and 3 to a point situated at a certain distance from the base of the pocket formed by those walls so that the walls define in conjunction with one another and with the partitions 5 juxtaposed compartments 6 which communicate with one another at their lower ends and which are open at their upper ends so that they may be connected to means for supplying gas under pressure on board a ground effect vehicle. When the cell is fed with gas under pressure, the communication between the compartments 6 provides for a uniform distribution of the pressure in the pocket formed between the walls 2 and 3.

However, in a variant (not shown), the partitions 5 may extend over the entire height of the walls 2 and 3 to the base of the pocket so as to form totally independent compartments 6 which, in the event of one or more of the compartments 6 developing leaks, enables a satisfactory pressure to be maintained in the other compartments 6.

FIGS. 3 and 4 show an improved cell according to the invention which comprises a base cell 1, deflectors 7 of elongate form and an additional wall 8. The deflectors 7 are arranged perpendicularly to the above-mentioned plane of symmetry between the parallel arms of the base cell 1. In addition, the deflectors 7 are inclined relative to the axis B—B of the frustoconoidal sector formed by the walls 2 and 3 in the same direction as the generatrices of that sector contained in the plane of symmetry and are offset relative to one another in an axial direction of the base cell 1. Although two deflectors 7 are shown in FIGS. 3 and 4, the improved cell according to the invention may comprise either a single deflector or even several deflectors 7 arranged over the entire height of the base cell 1 or only over a part thereof, depending upon the applications envisaged.

The additional wall 8 is in the form of part of a truncated conoid of which the concavity has the same direction as that of the walls 2 and 3. The additional wall 8 is fixed at its ends to the respective parallel arms of the base cell 1. Preferably the frustoconoidal portion formed by the additional wall 8 has a larger opening angle at its top than that formed by the parts in the form of frustoconoidal portions of the walls 2 and 3.

In two variants (not shown), the improved cell according to the invention may be formed by a base cell 1 equipped either solely with deflectors 7 or solely with an additional wall 8.

The different variants of improved cells thus formed represent improvements in the cells included in the gas cushion confinement system for ground effect vehicles described in French Patent Application No. 71.11-229, to which reference may be made regarding the application of these cells to a hovercraft.

In the case of a cell comprising a base cell 1 and deflectors 7, the deflectors 7 are intended to promote the feeding by peripheral jets of a gas cushion, these deflectors 7 being responsible for the directivity of the gas jet and, by a syphon effect, also provide for recirculation of the cushion gas in the jet itself. In the particular case of a deflector-equipped cell such as this, the generatrix of the wall 3 contained in the plane of symmetry preferably forms an angle of approximately 40° to 45° with the axis B—B.

In the case of an improved cell comprising a base cell 1 and an additional wall 8, the generatrix of the wall 3 situated in the plane of symmetry preferably forms an angle of from 10° to 15° with the axis B—B, while the generatrix of the wall 8 contained in this plane of symmetry forms an angle of from 10° to 15° with the axis B—B. The inner wall 2 and the additional wall 8 thus define in conjunction with one another a space which is open at its lower end and at its upper end and which forms a labyrinth for part of the gas flow.

Finally, in the case of an improved cell comprising deflectors 7 and an additional wall 8, the generatrix of the wall 3 contained in the plane of symmetry preferably forms an angle of 10° to 15° with the axis B—B, while the corresponding angle which the generatrix of the additional wall 8 situated in the plane of symmetry forms with the axis B—B preferably has a value of from 40° to 45°. In this case, the deflectors 7 co-operate with the additional wall 8 for ensuring the directivity of the gas jet feeding the cushion.

Referring more particularly to FIGS. 4 and 5, it can be seen that the deflectors 7 are formed by pneumatic elements having the profile of an aircraft wing and communicating directly with the space between the walls 2 and 3, so that the inflation of these pneumatic elements takes place at the same pressure as that of the base cell 1. The aircraft wing profile form of these deflectors 7 is obtained by means of flexible ribs 9a which are fixed transversely to the envelope 9b defining the pneumatic element and which are stretched between two surfaces, namely the upper surface and the lower surface, of this pneumatic element when it is inflated to an adequate pressure. These ribs are distributed at intervals over the entire length of each deflector and are formed with holes 10 which enable gas under pressure to flow from one arm of the base cell 1 to the other through the interior of each of the deflectors 7. The deflectors 7 according to the invention have the advantage of being completely flexible when the cell 1 is not under pressure and relatively rigid, while remaining light in weight, when the cell is under pressure. In addition, the deflectors 7 may readily be given any suitable profile by adjusting on the shape of the flexible ribs 9a.

Reference will now be made to FIG. 6 which shows, in a view taken from above, the confinement barrier for the gas cushion of a surface-effect craft comprising two rigid lateral keels 11 and two cells 1 according to the invention, namely a front cell whose flat lateral arms externally form tangents to each of the front ends of the lateral keels 11 and whose concavity is directed towards the gas cushion 12, and a rear cell which is arranged parallel to the front cell and whose flat lateral arms externally form tangents to each of the rear ends of the lateral keels 11 and whose concavity is directed outwards relative to the gas cushion 12. This type of barrier, which is suitable for small craft, is particularly advantageous by virtue of its simplicity because it uses a total of only two cells.

FIG. 7 shows a second embodiment of a confinement barrier for a surface-effect craft, in which the front closure and rear closure barriers are each formed by three cells 1 according to the invention fixed side by side between the lateral keels 11 and aligned perpendicularly of the longitudinal axis of the craft, the front closure and rear closure cells, in the same way as before, having their concavity directed inwards and outwards, respectively, relative to the gas cushion 12. Although three cells 1 are shown in FIG. 7, this number is by no means critical and may vary according to practical requirements, a multicell barrier having the advantage of greater permeability to waves and, hence, a reduction in the stresses produced by waves in the constituent material of the barrier in relation to a barrier formed by a single cell of the same width.

Finally, FIG. 8 shows a third embodiment of a confinement barrier for the gas cushion of a surface-effect craft with rigid lateral keels 11 in which the entire space between the keels 11 is occupied by rows 13, extending parallel to one another and one behind the other between the front and rear closure barriers, of cells 1 fixed side by side and aligned perpendicularly to the longitudinal axis of the craft in the same way as the cells 1 of the front and rear closure barriers shown in FIG. 7, all the cells 1 having their concavity directed towards the rear of the vehicle. This arrangement, i.e. dividing the gas cushion 12 into a series of individual cushions, provides for better stability of the craft by virtue of the fact that, if the craft tends to pitch on a certain side, the local pressure of the gas cushion in the zone where the craft is inclined tends to increase, thus generating a returning force which constantly brings the craft back into its equilibrium position.

FIG. 9 shows an application of the cell according to the invention in the formation of a confinement barrier for the supporting gas cushion of an amphibious hovercraft. This barrier is formed by the juxtaposition side by side of cells according to the invention around the entire periphery of the vehicle. The rear closure of this hovercraft is formed by a series of juxtaposed and aligned base cells 1 whose concavity is directed outwards relative to the gas cushion, while the lateral cells, which are directed perpendicularly to the axis of the hovercraft, and the front cells, which are arranged in a circular arc, may be formed by base cells 1, as shown diagrammatically in FIG. 9, or by any one of the variants of the improved cell according to the invention, these lateral and front cells all having their concavity directed inwards relative to the gas cushion 12. Although a single peripheral row of base cells 1 is shown in FIG. 9, the confinement barrier could also be formed by two or more concentric rows of these cells. In the two rear corners, the continuity of the confinement barrier is provided by two corner cells 14 similar to the base cell 1, except that their flat lateral arms form an angle of 90° with one another instead of being parallel. The two arms of each corner cell 14 bear respectively against a rear cell and against a lateral cell, these cells 14 having their concavity directed outwards relative to the gas cushion.

Finally, FIG. 10 shows a variant of the confinement barrier illustrated in FIG. 9, in which the rear closure of the gas cushion is formed by a row of base cells 1 arranged side by side and aligned and having their concavity directed outwards relative to the gas cushion 12, while the other cells forming the other three sides of the cushion are formed by improved cells of the type shown in FIG. 3.

This confinement barrier embodies the novel feature that the plane of symmetry of its constituent lateral cells is inclined at an angle of approximately 45° relative to the longitudinal axis of the hovercraft so that the lateral cells have their concavity directed both inwards and rearwards relative to the cushion, which minimizes the forces generated by the lateral scooping effect. Although front and lateral cells according to FIG. 3 are shown in FIG. 10, any other cell according to the invention would also be suitable.

In the two rear corners, the continuity of the confinement barrier is provided by two corner cells 15 similar to the corner cells 14 shown in FIG. 9, except that their lateral arms, which bear respectively against a rear cell and a lateral cell, form an angle of approximately 135° with one another.

In the embodiments illustrated by way of example in FIGS. 6 to 10, the connection between the cell and the vehicle is governed by the type of feed system used, i.e. "peripheral jet" or "bell", for the gas cushion. The connection may be made either directly to the rigid structure of the vehicle or by means of a flexible structure, as known per se.

If, as shown in FIG. 2, "R" is the radius of the major base of the frustoconical portion defined by the outer wall 3 and "r" is the radius of the major base of the frustoconical portion defined by the inner wall 2, the distance "e" separating the walls 2 and 3 is:

$$e = R - r$$

If, according to an essential feature of the invention, "Δp" is the pressure difference between the pressure of the gas cushion and atmospheric pressure, the pressure "p" to which the cell 1 according to the invention has to be inflated is as follows:

$$P \geq \Delta p \cdot (R/R - r)$$

When a cell 1 is inflated to the pressure $P = \Delta P (R/R - r)$, its natural tendency is to open and to assume its natural form, as shown for example in FIGS. 1 and 3, and the cell 1 thus inflated behaves like a type of air bed with inherent elasticity which enables it to be deformed and immediately to return to its normal shape once the forces responsible for its deformation have disappeared. Accordingly, this type of cell is particularly suitable for forming the rear closure of the gas cushion of surface-effect craft because, by virtue of the inherent elasticity, the cells 1 may be disposed with their convex surface directed towards the front of the craft, in which position they provide for minimization of the scooping phenomenon while, at the same time, showing a high permeability to waves, by virtue of their deformability, and a high degree of impermeability to the cushion gas by virtue of the elastic forces which cause them to return rapidly to their normal position.

In addition, when the cells 1 are juxtaposed side by side in a row, the pressure prevailing in the cells as a whole and the fixing of these cells to one another by their lateral arms makes them co-operate to ensure rigidity of the row thus formed.

Although the cells 1 according to the invention have particularly significant advantages over conventional cells in the case of the rear closure of a gas cushion, by virtue of the fact that conventional cells do not have sufficient rigidity of their own to be arranged with their convex surface directed towards the front of the craft and hence give rise to a significant scooping phenomenon if they are arranged in the opposite direction, these advantages are also obtained in the case of the lateral or front closure of a gas cushion.

What is claimed is:

1. A flexible gas cushion confinement cell for a ground-effect vehicle, which comprises two flexible walls (2,3) which extend substantially parallel to one another, and flexible partitions (5) which extend transversely of the walls (2,3) and which join them together over at least part of their height, said walls (2,3) defining in conjunction with one another and with said partitions (5) juxtaposed compartments (6) which have open upper ends to enable them to be connected to means for supplying gas under pressure, and which are at least substantially closed at their lower ends, said walls being at least partly in the form of part of a truncated conoid and cooperatively defining a frustoconoidal sector having major and minor bases at said upper and lower ends respectively.

2. A cell as claimed in claim 1, wherein the partitions (5) extend over the entire height of said walls (2,3) and define independent compartments (6).

3. A cell as claimed in claim 1, wherein the partitions (5) at their lower ends, on the side opposite the upper open part of the compartments (6) form openings such that the compartments (6) are in communication with one another.

4. A cell as claimed in claim 1, wherein each wall (2,3) comprises two flat sections each tangentially extending its section in the form of part of a truncated conoid from one of its limiting generatrices, said flat sections of the walls (2,3) forming two arms extending in the extension of said frustoconoidal sector symmetrically in relation to the plane of symmetry of said frustoconoidal sector.

5. A cell as claimed in claim 4, wherein said symmetrical arms formed by the walls (2,3) are each extended by two flexible supporting sails for connection to said vehicle.

6. A cell as claimed in claim 4, wherein said arms are parallel to one another.

7. A cell as claimed in claim 4 which further comprises at least one deflector of elongate form arranged between the two sides of the cell (1) and fixed at each of its ends to the inner wall (2).

8. A cell as claimed in claim 7, wherein said deflector (7) comprises a pneumatic element defined by an envelope (9b) and communicating directly with the space between the walls (2,3) for its inflation to the same pressure as the compartments (6).

9. A cell as claimed in claim 8, wherein said deflector further comprises flexible ribs (9a) fixed transversely to the envelope (9b) and adapted to be stretched between the two surfaces of the envelope when it is inflated to said pressure.

10. A cell as claimed in claim 9, wherein said pneumatic element has the cross-sectional profile of an aircraft wing.

11. A cell as claimed in claim 4 which further comprises between its two arms an additional flexible wall (8) which is at least partly in the form of part of a truncated conoid and whose concavity is oriented in the same direction as that of the frustoconoidal sector, said additional wall (8) being fixed at each of its ends to said inner wall (2) and forming with it a space which is open at its upper and lower ends.

12. A cell as claimed in claim 11, wherein said frustoconoidal sector and said frustoconoidal portion of the additional wall (8) have an opening angle at the upper end of from 10° to 15°.

13. A cell as claimed in claim 11, wherein said frustoconoidal sector has an opening angle at its upper end of from about 10° to 15°, whilst said frustoconoidal portion of the additional wall (8) has an opening angle at its upper end of from about 40° to 45°.

14. A cell as claimed in claim 1, wherein said frustoconoidal sector has an opening angle at its upper end of from 5° to 45°.

15. A confinement barrier for the supporting gas cushion of a ground effect vehicle of the type comprising a front closure barrier, a rear closure barrier and two lateral closure barriers, wherein at least said rear closure barrier is formed by at least one cell (1) as claimed in claim 1 arranged between the respective ends of said lateral closure barriers.

16. A barrier as claimed in claim 15 wherein said cell (1) has a concavity directed towards the rear of the vehicle.

17. A barrier as claimed in claim 16, wherein said rear closure barrier is formed by a series of cells (1) fixed side by side and aligned perpendicularly to the longitudinal axis of the vehicle.

18. A barrier as claimed in claim 17 in which the lateral closure barriers are formed by rigid lateral keels integral with the vehicle, and which additionally comprises several rows (13) of cells (1) fixed side by side and aligned perpendicularly to the longitudinal axis of the vehicle with their concavity directed towards the rear of the vehicle, said rows (13) being parallel to one another and extending one behind the other between the two end rows forming said front and rear closure barriers.

19. A barrier as claimed in claim 17, wherein said lateral and front closure barriers are formed by at least one row of cells fixed side by side to the periphery of the vehicle with their concavity directed inwards relative to the gas cushion.

20. A barrier as claimed in claim 19, wherein said cells of the front and lateral closure barriers have their concavity directed partly towards the rear of the vehicle, their plane of symmetry forming an angle of approximately 45° with longitudinal axis of the vehicle.

21. A barrier as claimed in claim 20, wherein the inflation pressure P of the compartments (6) of each cell is:

$$P \geq \Delta p \, (R/R - r)$$

where $\Delta p$ is the pressure difference between the pressure of the gas cushion and atmospheric pressure, "$R$" is the outer radius of the major base of the frustoconoidal sector and "$r$" is the inner radius of the major base of the frustoconoidal sector.

* * * * *